Dec. 14, 1954  J. POLARD  2,696,658
METHOD OF MANUFACTURING ELECTRIC MACHINE COMMUTATORS
Filed Jan. 23, 1951
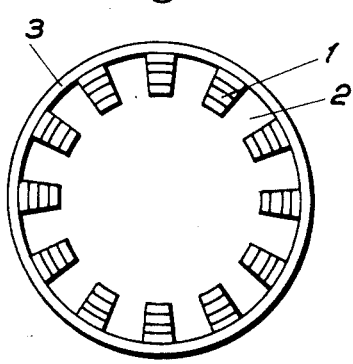
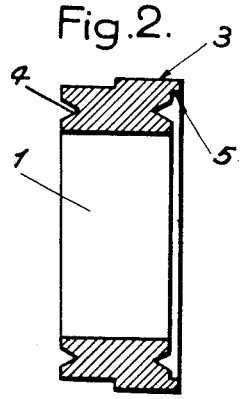
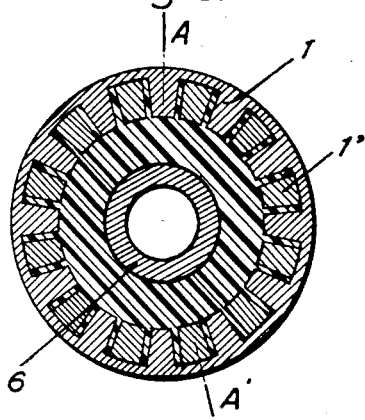
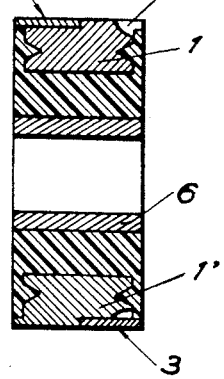
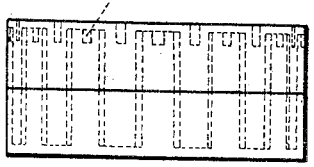
Inventor
Jean Polard
By Robert E. Burns
Attorney

United States Patent Office 2,696,658
Patented Dec. 14, 1954

2,696,658
METHOD OF MANUFACTURING ELECTRIC MACHINE COMMUTATORS

Jean Polard, Saint-Germain-en-Laye, France, assignor to Societe Anonyme so-called: Compagnie Electro-Mecanique, Paris, Seine, France Application January 23, 1951, Serial No. 207,326

2 Claims. (Cl. 29—155.54)

The production of electric machine commutators is expensive on account of the considerable time required to manufacture and assemble the copper segments as well as the web-like insulators with the accuracy necessary to ensure satisfactory performance. Various methods have already been resorted to for the purpose of decreasing the time necessary for the assembly by making the insulation of a plastic material capable of being hardened by the application of heat and adapted at the same time to keep the segments assembled. According to these methods, the segments are made by starting from copper sheets, bands or tubes which are machined to the required dimensions, all the segments remain solid with one another until the plastic material has been injected. Of course, the time required for the assembly is spared, yet time is still required for the machining step, in addition to which, generally, the sets of segments providing each a whole commutator can only be manufactured one by one.

The purpose of the method disclosed hereinafter is to completely do away with any preparatory machining while making it possible to simultaneously produce a number of segment sets, whereby the time necessary for the production of the whole commutator is cut down quite appreciably.

The said method of manufacturing electric machine commutators consists in separately molding a pair of complementary elements each of which includes half the number of segments in the collector, which segments are tied together by a thin external ring, enclosing the two said elements in interlocking relation to each other in a common mold, pressing a plastic material into the spaces delimited by said segments, the said rings and the walls of the mold and removing the said segment-interconnecting rings.

Preferably, the pair of exactly similar commutator elements are made of sintered material; in each of them the segments are tied to one another by a ring extending axially at the most over one half of the width of the commutator; moreover, said elements are angularly displaced relative to each other by an angle equal to the pitch of the segments in the collector.

An embodiment of the present invention is illustrated by way of example in the appended drawing, in which:

Figure 1 is an elevational view of one element in the pair.

Figure 2 is a longitudinal sectional view of said element taken on a diameter through two opposite segments.

Figure 3 is an end elevational view of a commutator at a definite stage of its manufacture after the insulating plastic material has been pressed into the interstices between the two interlocked elements.

Figure 4 is a sectional view taken on the broken line A—A in Fig. 3.

Figure 5 is a side view of the same commutator.

According to the invention, a commutator element is made by any known sintering process which is formed with half the number of segments in the finished commutator (see Fig. 1). The said segments 1 are uniformly spaced and the distance between any two successive segments is equal to the width of a segment plus twice the thickness of the insulating layer. They are interconnected by a peripheral ring solid therewith which need not be thicker than necessary to prevent the element from being distorted in the course of its manipulation. The segments are formed at their ends with notches 4 (see Fig. 2) in which subsequently the insulating plastic material will become anchored. The interconnecting ring is formed at its outer end with a shallow depression 5 whereby a more accurate centering of the element in the mold is obtained and an access is given to the plastic material up to the outer diameter of the segments. The said ring 3 extends over a portion of the length of the segments which however should not exceed one half of the same. The commutator element thus defined is simple in design and can be obtained readily and rapidly by a sintering process carried out in a mold, no complementary machining being needed.

In a further step of manufacture a pair of commutator elements similar to the one just described are arranged each in the one half of a mold.

In the closed mold the elements are so positioned relative to each other that the segments 1' of the one element intermesh with the segments 1 of the other element and that a uniform interval is defined between each pair of successive segments which corresponds to the thickness of the insulating layer (see Fig. 3); the two ring portions 3, 3' are located opposite each other and may even abut each other as shown in Fig. 4.

If found advisable, it is also possible to arrange a central bushing 6, preferably made of steel, within the mold, which later on will be useful in mounting the finished commutator on the electric machine shaft to be fitted therewith.

As a result of the injection of a plastic material the two elements are rigidly assembled to a complete commutator. The commutator rough thus obtained is then brought to its final shape and size by removing the segment-interconnecting ring on the lathe. Figs. 3 and 5 illustrate the position of the commutator elements relative to each other.

This method makes it also possible to form the sintered commutator elements with notches 7 as shown in Figs. 4 and 5 for the connection of the armature sections with the commutator, whereby extra work is saved.

It remains within the scope of this invention to shape the commutator elements described hereinbefore otherwise than by sintering since they may as well be obtained by a refined molding process or by chill molding followed with a dying to size.

What I claim is:

1. A method of manufacturing electric machine commutators which consists in separately molding a pair of complementary elements each of which includes half the number of segments in the collector, which segments are equidistantly spaced and tied together by a thin external ring, enclosing the two said elements in intermeshing relation to each other in a common mold, arranging a central bushing within said mold, and pressing an insulating plastic material into the space delimited by said segments, said ring, said bushing and the walls of the mold, thereby simultaneously forming an internal hub of insulating plastic material adjacent the segments and the bushing.

2. A method of manufacturing electric machine commutators which consists in separately molding a pair of complementary elements each of which includes half the number of segments in the collector, which segments are equidistantly spaced and tied together by a thin external ring, enclosing the two said elements in intermeshing relation to each other in a common mold, arranging a central bushing within said mold, pressing an insulating plastic material into the space delimited by said segments, said ring, said bushing and the walls of the mold, thereby simultaneously forming an internal hub of insulating plastic material adjacent the segments and the bushing, and finally removing the aforesaid segment-interconnecting rings.

References Cited in the file of this patent

UNITED STATES PATENTS

| Number | Name | Date |
|---|---|---|
| 264,230 | Beardslee | Sept. 12, 1882 |
| 927,675 | Perkins | July 13, 1909 |
| 1,407,776 | Stone | Feb. 28, 1922 |
| 1,875,204 | Apple | Aug. 30, 1932 |
| 2,053,662 | Hardy | Sept. 8, 1936 |
| 2,236,257 | Borchers | Mar. 25, 1941 |
| 2,451,500 | Le Greid | Oct. 19, 1948 |